United States Patent
Liu et al.

(10) Patent No.: US 11,256,862 B2
(45) Date of Patent: Feb. 22, 2022

(54) COGNITIVE COLLATION CONFIGURATION FOR ENHANCING MULTILINGUAL DATA GOVERNANCE AND MANAGEMENT

(71) Applicant: International Business Machines Corporation, Armonk, NY (US)

(72) Inventors: Su Liu, Austin, TX (US); Boyi Tzen, Taipei (TW); Fan Yang, Beijing (CN); Denise M. Genty, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 127 days.

(21) Appl. No.: 16/168,245

(22) Filed: Oct. 23, 2018

(65) Prior Publication Data

US 2020/0125634 A1    Apr. 23, 2020

(51) Int. Cl.
*G06F 40/205* (2020.01)
*G06N 20/00* (2019.01)
*G06F 40/263* (2020.01)

(52) U.S. Cl.
CPC .......... *G06F 40/205* (2020.01); *G06F 40/263* (2020.01); *G06N 20/00* (2019.01)

(58) Field of Classification Search
CPC .. G06F 17/2705; G06F 17/275; G06F 40/205; G06F 40/263; G06N 20/00; G06N 99/005
See application file for complete search history.

(56) References Cited

U.S. PATENT DOCUMENTS 5,351,190 A * 9/1994 Kondo ................ H04M 1/2748
704/8
5,675,818 A    10/1997 Kennedy
(Continued)

FOREIGN PATENT DOCUMENTS

CA    2145672 A1    9/1994
CN    102135969 A    7/2011
(Continued)

OTHER PUBLICATIONS

International Search Report and Written Opinion for PCT/IB2019/058946; Application Filing Date Oct. 21, 2019; dated Jan. 31, 2020 (9 pages).

(Continued)

*Primary Examiner* — Angela A Armstrong
(74) *Attorney, Agent, or Firm* — Cantor Colburn LLP; Nathan Rau

(57) ABSTRACT

Embodiments of the present invention provide a computer-implemented method for cognitive collation configuration processing of multilingual data. The method includes parsing a multilingual input text into a plurality of collation items. The method includes detecting a language of each collation item of the plurality of collation items. The method includes storing each collation item, of the plurality of collation items, into a corresponding sub language buffer of a plurality of sub language buffers. The method includes performing a first sort operation on the plurality of sub language buffers, in which the first sort operation includes sorting the plurality of sub language buffers based on a set of collation settings, in which the set of collation settings includes a language selection list. The method includes merging the content of the sorted plurality of sub language buffers to form a sorted output comprising the plurality of collation items.

25 Claims, 9 Drawing Sheets

(56) References Cited

U.S. PATENT DOCUMENTS

| | | | |
|---|---|---|---|
| 5,687,366 A | 11/1997 | Harvey, III et al. | |
| 5,799,303 A * | 8/1998 | Tsuchimura | G06F 7/22 |
| 5,873,111 A | 2/1999 | Edberg | |
| 6,119,064 A | 9/2000 | Nakaguro et al. | |
| 6,199,064 B1 | 3/2001 | Schindler | |
| 6,389,386 B1 * | 5/2002 | Hetherington | G06F 40/53 |
| | | | 704/8 |
| 6,928,438 B2 | 8/2005 | Daray et al. | |
| 7,165,020 B2 | 1/2007 | Lissauer et al. | |
| 7,899,665 B2 * | 3/2011 | Davis | G06F 40/263 |
| | | | 704/8 |
| 7,941,311 B2 | 5/2011 | Kaplan et al. | |
| 7,941,484 B2 | 5/2011 | Chandler et al. | |
| 8,355,919 B2 * | 1/2013 | Silverman | G10L 13/08 |
| | | | 704/260 |
| 8,549,023 B2 * | 10/2013 | Guo | G06F 16/90344 |
| | | | 707/758 |
| 8,682,644 B1 * | 3/2014 | Davis | G06F 7/22 |
| | | | 704/8 |
| 9,588,966 B2 | 3/2017 | Eck | |
| 10,423,999 B1 * | 9/2019 | Doctor | G06Q 30/0601 |
| 2002/0174100 A1 * | 11/2002 | Daray | G06F 7/08 |
| 2005/0234898 A1 | 10/2005 | Drissi et al. | |
| 2006/0100857 A1 * | 5/2006 | Wissink | G06F 40/129 |
| | | | 704/10 |
| 2006/0288286 A1 | 12/2006 | Chandler et al. | |
| 2007/0088699 A1 | 4/2007 | Edmondson | |
| 2016/0241501 A1 | 8/2016 | Liu et al. | |
| 2017/0046333 A1 * | 2/2017 | Mirkin | G06F 40/58 |
| 2017/0364510 A1 * | 12/2017 | Huang | G06F 16/951 |

FOREIGN PATENT DOCUMENTS

| | | | |
|---|---|---|---|
| CN | 104933072 A | | 9/2015 |
| CN | 106503195 A | | 3/2017 |
| JP | H07120397 | * | 12/1995 |
| JP | 4289891 B2 | * | 7/2009 |

OTHER PUBLICATIONS

Mell et al.; "The NIST Definition of Cloud Computing-Recommendations of the National Institute of Standards and Technology"; U.S. Department of Commerce; Sep. 2011; 7 pages.

European Examinarion Report for Application No. GB2106610.5 dated Jul. 29, 2021, 4 pages.

\* cited by examiner

FIG. 7

```
das ist klüger business—a neue ?ra gebracht, die welt von einer neuen ibm.
das ist klüger business—a neuera gebracht, die welt von einer neuen ibm.           } 802
es ist ein gesch?ft, aus sich auf plattformen mit digitaler intelligenz.unternehmen.
gesellschaft von experten, deren kenntnisse erweitert durch systeme lernen.
viele arten von wolken gibt, sondern nur die ibm cloud baut das unternehmen in der la  } 804
der künstlichen intelligenz, weltweit führende sicherheits — und die f?higkeit, sich
it's a business remaking itself on platforms infused with digital intelligence. An e
systems. A company of experts whose knowledge is augmented by systems that learn.
Many types of clouds exist, but only the IBM Cloud is built for the enterprise, is ab
artificial intelligence, world-leading security and the ability to evolve over time.   } 806
This is smarter business—a new era, brought to the world by a new IBM.
This is smarter business—a new era, brought to the world by a new IBM.              } 808
This is smarter business—a new era, brought to the world by a new IBM.

c'est plus intelligent business—a nouvelle ère, mis au monde par une nouvelle ibm.
c'est un business remaking lui – même sur des plates – formes infusé avec digital int   } 810
avec les systèmes intelligents.une société d'experts dont les connaissances sont comp
de nombreux types de nuages existent, mais seulement l'ibm nuage est construit pour l
prévoit une intégration sans heurt de l'intelligence artificielle, la sécurité et l'a

[Japanese text]                                                                        } 812

[Russian text]                                                                         } 814

[Chinese text]
```

FIG. 8

COGNITIVE COLLATION CONFIGURATION FOR ENHANCING MULTILINGUAL DATA GOVERNANCE AND MANAGEMENT

BACKGROUND

The present invention generally relates to multilingual data governance and management of text, and more specifically, to cognitive collation configuration for enhancing multilingual data governance and management.

Data governance generally refers to a process performed by data management systems to ensure that data meets certain precise standards as the data is imported into the system. Some platforms have been developed to provide a unified governance and integration approach for managing data processing rules and policies. Data collation is often one of the key features of data governance and management.

Modern operating systems such as Linux, UNIX, iOS, and Android rely on processing and sorting of multilingual data. The use of multilingual data in technology is ever expanding. For example, a UNIX system log may contain text information written in 100 languages/scripts. An email server may need display and sort email subjects with different languages and/or scripts. Similarly, a cloud storage folder may contain thousands of named files which are written in multiple languages. In UNIX, for instance, the operating system utilizes a sort via a standard command line program to collate an input item list in a certain order defined by a current locale. Presently, no systems or tools exist that can sort multilingual data according to the separated language and locale collation rules.

SUMMARY

Embodiments of the present invention provide a computer-implemented method for cognitive collation configuration processing of multilingual data. A non-limiting example of the computer-implemented method includes parsing, by a system comprising one or more processors, a multilingual input text into a plurality of collation items. The method includes detecting, by the system, a language of each collation item of the plurality of collation items. The method includes storing, by the system, each collation item, of the plurality of collation items, into a corresponding sub language buffer of a plurality of sub language buffers. The method includes performing, by the system, a first sort operation on the plurality of sub language buffers, in which the first sort operation includes sorting the plurality of sub language buffers based on a set of collation settings, in which the set of collation settings includes a language selection list. The method includes merging, by the system, content of the sorted plurality of sub language buffers to form a sorted output comprising the plurality of collation items.

Embodiments of the present invention provide a computer-implemented method for cognitive collation configuration processing of multilingual data. A non-limiting example of the method includes transmitting, by a system comprising one or more processors, a sorting request to a backend system, in which the sorting requests includes a multilingual input text. The backend system is configured to parse the multilingual input text into a plurality of collation items. The backend system is further configured to detect a language of each collation item of the plurality of collation items. The backend system is further configured to store each collation item, of the plurality of collation items, into a corresponding sub language buffer of a plurality of sub language buffers. The backend system is further configured to perform a first sort operation on the plurality of sub language buffers, in which the first sort operation includes sorting the plurality of sub language buffers based on a set of collation settings, and in which the set of collation settings includes a language selection list. The backend system is further configured to merge the content of the sorted plurality of sub language buffers to form a sorted output having the plurality of collation items.

Embodiments of the present invention provide a system for cognitive collation configuration processing of multilingual data. The system includes one or more processors configured to perform a method. A non-limiting example of the method includes parsing, by the system, a multilingual input text into a plurality of collation items. The method includes detecting, by the system, a language of each collation item, of the plurality of collation items. The method includes storing, by the system, each collation item, of the plurality of collation items, into a corresponding sub language buffer of a plurality of sub language buffers. The method includes performing, by the system, a first sort operation on the plurality of sub language buffers, in which the first sort operation includes sorting the plurality of sub language buffers based on a set of collation settings, in which the set of collation settings includes a language selection list. The method includes merging, by the system, the content of the sorted plurality of sub language buffers to form a sorted output having the plurality of collation items.

Embodiments of the invention provide to a computer program product for cognitive collation configuration processing of multilingual data, the computer program product comprising a computer readable storage medium having program instructions embodied therewith. The program instructions are executable by a backend system comprising one or more processors to cause the backend system to perform a method. A non-limiting example of the method includes parsing, by the backend system, a multilingual input text into a plurality of collation items. The method includes detecting, by the backend system, a language of each collation item of the plurality of collation items. The method includes storing, by the backend system, each collation item, of the plurality of collation items, into a corresponding sub language buffer of a plurality of sub language buffers. The method includes performing, by the backend system, a first sort operation on the plurality of sub language buffers, in which the first sort operation includes sorting the plurality of sub language buffers based on a set of collation settings, in which the set of collation settings includes a language selection list. The method includes merging, by the backend system, content of the sorted plurality of sub language buffers to form a sorted output having the plurality of collation items.

Embodiments of the present invention provide a system for cognitive collation configuration processing of multilingual data. A non-limiting example of the system includes a frontend component, a backend component, one or more processors, and a memory operably coupled to the one or more processors. The frontend component is configured to transmit a sorting request to the backend component, in which the sorting request includes a multilingual input text. The backend component is configured to parse the multilingual input text into a plurality of collation items. The backend component is further configured to detect a language of each collation item of the plurality of collation items. The backend component is further configured to store each collation item, of the plurality of collation items, into a corresponding sub language buffer of a plurality of sub language buffers. The backend component is further configured to perform a first sort operation on the plurality of sub language buffers, in which the first sort operation includes sorting the plurality of sub language buffers based on a set of collation settings, and in which the set of collation settings includes a language selection list. The backend component is further configured to merge the content of the sorted plurality of sub language buffers to form a sorted output having the plurality of collation items.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts an example multilingual data input in accordance with one or more embodiments of the present invention;

FIG. 8 depicts an example enhanced sorted output that may be generated in response to sorting the unsorted text input of FIG. 7 in accordance with one or more embodiments of the present invention.

Figure 1:
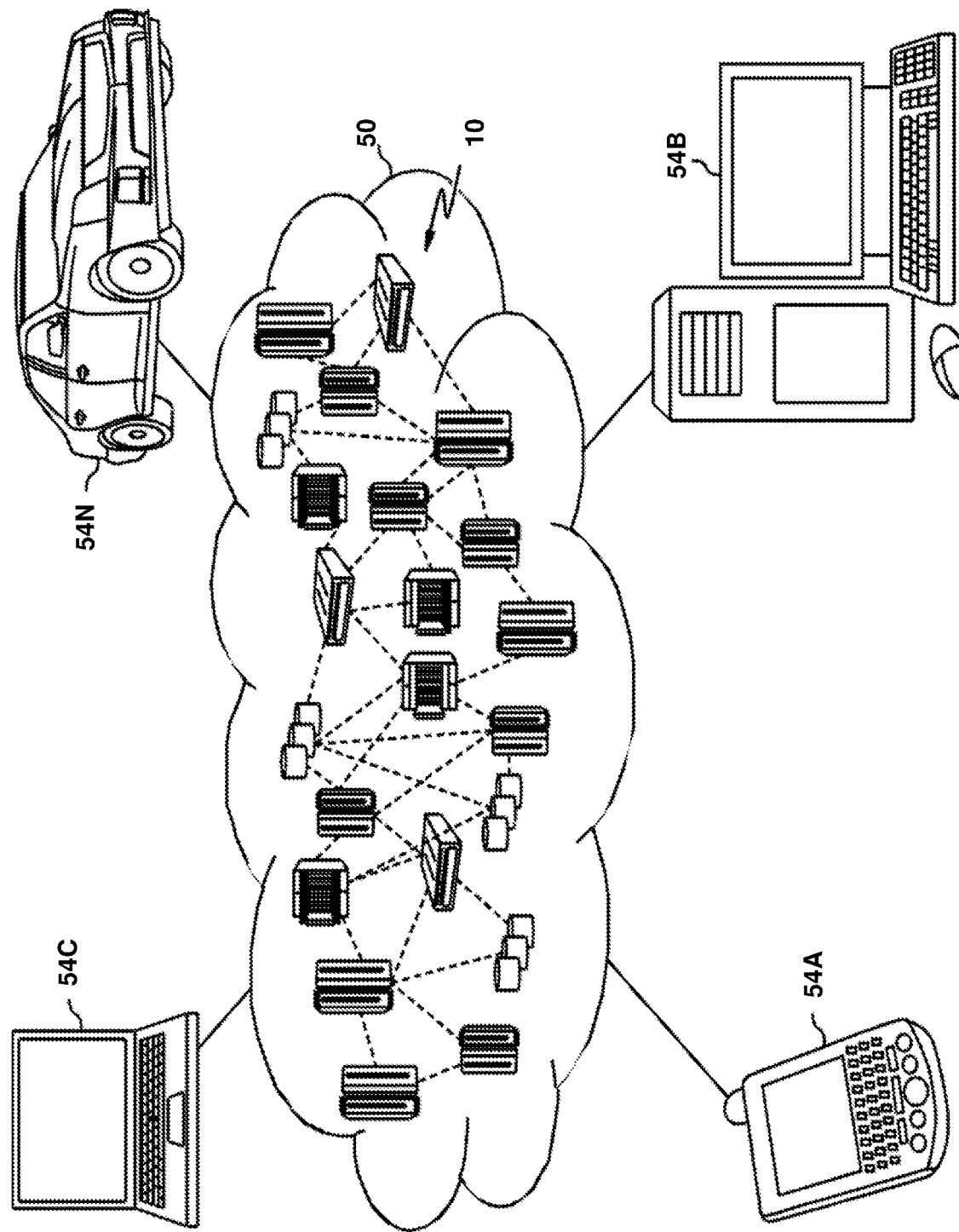
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
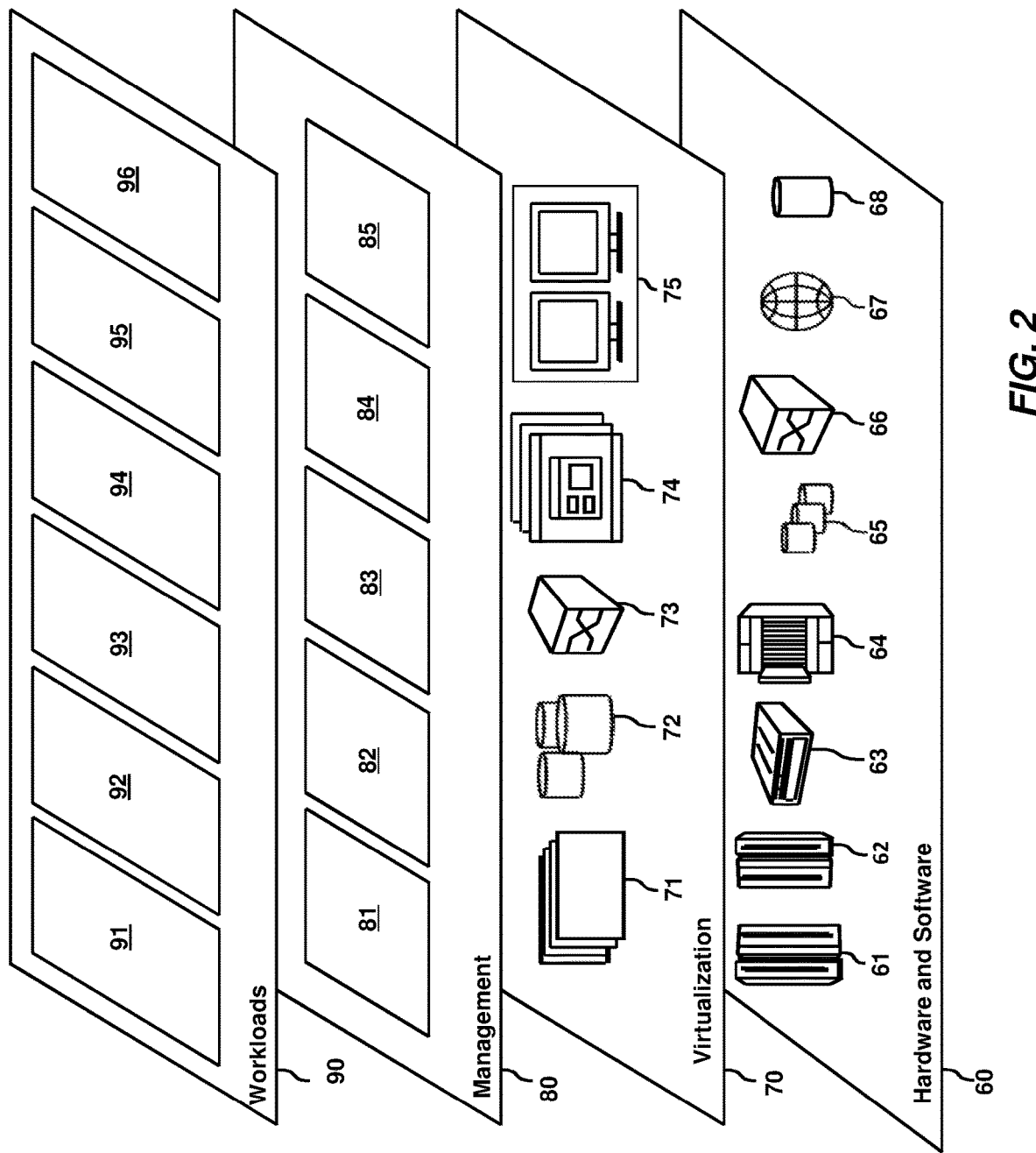
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive collation configuration service processing 96.

Turning now to an overview of technologies that are more specifically relevant to aspects of the invention, as noted above, data governance generally refers to a process performed by data management systems to ensure that data meets certain precise standards as the data is imported into the system. Some platforms have been developed to provide a unified governance and integration approach for managing data processing rules and policies. Data collation is often one of the key features of data governance and management.

Collation settings are a set of rules for comparing characters in a locale, in which the unit of comparison is called a collation element or collation unit. A locale is an environment of a user that defines a convention for a specified culture. A collation element may be one character, such as "a", "A", and "2" in English and "a", "a" with accent, in French, or a sequence of characters, such as "ch" in French and "OE" in German. Collation rules determine the sorting order of collation elements of a locale. Because collation rules are locale-specific, a set of collation elements may be sorted differently in different locales. For example, letters "A", "B", "D", and "c" may be sorted as "A B D c" in English and "A B c D" in French. Traditionally, collation rules are normally governed by a locale-based specification or standard, in which a sorted order of a given list depends on the locale that the sorting program is running. Same languages that are in different locales may have different collation rules.

Modern operating systems such as Linux, UNIX, iOS, and Android rely on processing and sorting of multilingual data. The use of multilingual data in technology is ever expanding. For example, a UNIX system log may contain text information written in 100 languages/scripts. An email server may need display and sort email subjects with different languages and/or scripts. Similarly, a cloud storage folder may contain thousands of named files which are written in multiple languages. In UNIX, for instance, the operating system utilizes a sort via a standard command line program to collate an input item list in a certain order defined by a current locale.

The process identified above can be prone to several technical issues. For example, since collation rules are normally governed by a locale-based specification or standard, a sorted order of a given multilingual list only depends on the current locale that the sorting program is running. Presently, there was no ideal and intelligent way to sort items combined with different languages, scripts and locales according to the correlated collations defined in different languages and locales. For example, no systems or tools exist that can sort multilingual data according to the separated language and locale collation rules. In UNIX, the command "ls", in the standard command line program, only lists multilingual file names under a single locale collation rule.

Turning now to an overview of the aspects of the invention, one or more embodiments of the invention address the above-described shortcomings of the prior art by providing a method of cognitive collation configuration (CCC) processing of multilingual data for enhancing multilingual data governance and management.

The method includes parsing input text into a plurality of collation items $item_i(item_1, item_2, item_3, \ldots, item_m)$. The method includes detecting a language for each given parsed item $(item_i, L_k)$, in which language $L_k(L_1, L_2, L_3, L_4, \ldots, L_n)$. The method includes saving each detected item into a corresponding sub language buffer, $b[L_k] \in (b[L_1], b[L_2], b[L_3], b[L_4], \ldots, b[L_n])$. The method includes performing a first sort operation, in which the first sort operation includes sorting all the sub language buffers $(b[L_1], b[L_2], b[L_3], b[L_4], \ldots, b[L_n])$ based on a current language and/or locale setting. In some embodiments of the present invention, the method further or alternatively includes performing a second sort operation, in which the second sort operation includes performing a sort within each sub language buffer $(b[L_k])$ by, for example, sorting each of $(b[L_1], b[L_2], b[L_3], b[L_4], \ldots, b[L_n])$. In some embodiments of the present invention, the second sort operation is based on locale setting criteria of the CCC criteria, such as for example, a locale selection list. The method includes merging the content of all the sub language buffers as a new sorted output.

In some embodiments of the present invention, real-time CCC criteria are defined, in which the CCC criteria includes a default locale selection policy (e.g., a locale selection list), a minimum language section, and/or a language determination threshold. In some embodiments of the present invention, a CCC data structure is defined for tracking collation preferences of one or more users. CCC criteria is a set of CCC rules that is used to support the CCC service(s) set forth herein. In some embodiments of the present invention, the CCC criteria includes a minimum language section, a language determination threshold, default locale selection policies(s), and other suitable CCC rules. The minimum language section sets forth the smallest language/script classification unit for determining a language and for grouping the input contents. Table 1 below illustrates an example cognitive minimum language section settings in accordance with one or more embodiments of the present invention.

TABLE 1

Cognitive Minimum Language Section Settings

| Character-Alphabetic Based | Geo-Location Based | Language Based |
|---|---|---|
| Latin alphabet No. 1, (ISO 8859-1) | "Western", "West European" | English, French, German, Spanish, Icelandic. |
| Latin alphabet No. 2, (ISO 8859-2) | "Central European", "East European" | Albanian, Bosnian, Croatian, Czech, German (fully compatible with ISO/IEC 8859-1 for German texts), Hungarian, Polish, Romanian (note the comments below), Serbian Latin, Slovak, Slovene, Upper Sorbian, Lower Sorbian, Turkmen. |
| Latin alphabet No. 3, (ISO 8859-3) | "South European"; "Maltese & Esperanto" | Turkish, Maltese, and Esperanto. |
| Latin alphabet No. 4, (ISO 8859-4) | "North European" | Estonian, Latvian, Lithuanian, Greenlandic, and Sami. |
| Cyrillic alphabet, (ISO 8859-5) | Slavic area | Bulgarian, Belarusian, Russian, Serbian, and Macedonian. |
| South-Eastern Europe, (ISO 8859-16) | South-Eastern Europe region | Albanian, Croatian, Hungarian, Polish, Romanian, Serbian and Slovenian, but also French, German, Italian, and Irish Gaelic. |
| Chinese | Great China Area | Simplified Chinese, Traditional Chinese. |
| CJK, (Chinese, Japanese, Korean) | Eastern Asia | Chinese, Japanese, Korean. |
| Indic | Indian subcontinent | Bengali, Hindi, Urdu, and Punjabi. |

In a scenario where minimum language section settings are defined as shown in Table 1, if a minimum language section of a particular user is set to Latin-1, then the CCC service will group any contents of English, French, German, Spanish, and Icelandic as one sub sorting buffer. If a minimum language section a particular user is set to Chinese, then the CCC service will group any contents of Simplified Chinese and Traditional Chinese as one sub language sorting buffer. If a minimum language section a particular user is set to CJK, then CCC service will group any contents of Chinese, Japanese, and Korean as one sub language sorting buffer.

The language determination threshold is a predetermined language determination threshold that is used to determine the language of a particular collation item such as a particular line, row, independent line, string separated by a delimiter, or paragraph of text. A collation item is a basic entry of a sequencing and sorting unit in a certain language and locale. For example, a collation item may be "apple" or "banana" in a fruit list. In some embodiments of the present invention, the language determination threshold is a minimum percentage of characters in a collation item. For example, if the language determination threshold is 80% then, in some embodiments of the present invention, a collation item would be detected being in a certain language if at least 80% of the characters of the collation item (i.e., the collation elements of the collation item) are detected as being in the certain language. This provides assistance for situations where a particular collation item has a mix of text from different languages. In some embodiments of the present invention, the language determination threshold is a set of one or more symbols or units (e.g., (¥), (° C.), (° F.), etc.) that may be used to detect the language of a given collation item. In some embodiments of the present invention, the language determination threshold sets forth certain words that may not be used to detect a language of a given collation item such as, for example, certain entity names (e.g., IBM) and/or certain acronyms (e.g., "LOL" as an acronym of "laugh out loud"). For instance, a collation item that recites "IBMはトップ10の米国企業の1つです [IBM is one of the top ten US companies]" would be determined as being written in Japanese, instead of English even though the word "IBM" is in English.

In some embodiments of the present invention, default locale selection policies (e.g., a locale selection list) are used to determine which locale collation rule shall be used in CCC service for a given user. Table 2 below illustrates example default cognitive locale selection policies in accordance with one or more embodiments of the present invention.

TABLE 2

Default Cognitive Locale Selection Policies

| Language | Region | Locale Name | Set as Default Locale |
|---|---|---|---|
| French | Algeria | fr_DZ.UTF-8 | |
| French | Belgium | fr_BE.UTF-8 | |
| French | Canada | fr_CA.UTF-8 | Default for User-B |
| French | Cameroon | fr_CM.UTF-8 | |
| French | Democratic Republic of the Congo | fr_CD.UTF-8 | |
| French | France | fr_FR.UTF-8 | Default for User-A |
| French | Luxembourg | fr_LU.UTF-8 | |
| French | Ivory Coast | fr_CI.UTF-8 | |
| French | Mauritania | fr_MR.UTF-8 | |
| French | Mauritius | fr_MU.UTF-8 | |
| French | Morocco | fr_MA.UTF-8 | |
| French | Senegal | fr_SN.UTF-8 | |
| French | Switzerland | fr_CH.UTF-8 | |
| French | Tunisia | fr_TN.UTF-8 | |

In the context of the example shown in Table 2, French content can be any French locale defined in Table 2, such as fr_FR.UTF-8 (French France), fr_CA.UTF-8 (French Canada), etc. In this example, French locale fr_FR.UTF-8 is set as the default French locale for user-A for sorting all French contents, whereas French Locale fr_CA.UTF-8 is set as the default French Locale for user user-B for sorting all French contents. In some embodiments of the present invention, if a default locale has not been pre-set, then a locale is set based on a locale that is selected by other users having similar commonalities.

In some embodiments of the present invention, the method includes executing one or more machine learning algorithms to monitor and learn collation settings of one or more users, and then to adjust the CCC criteria in view of the learned collation setting preferences.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 3:
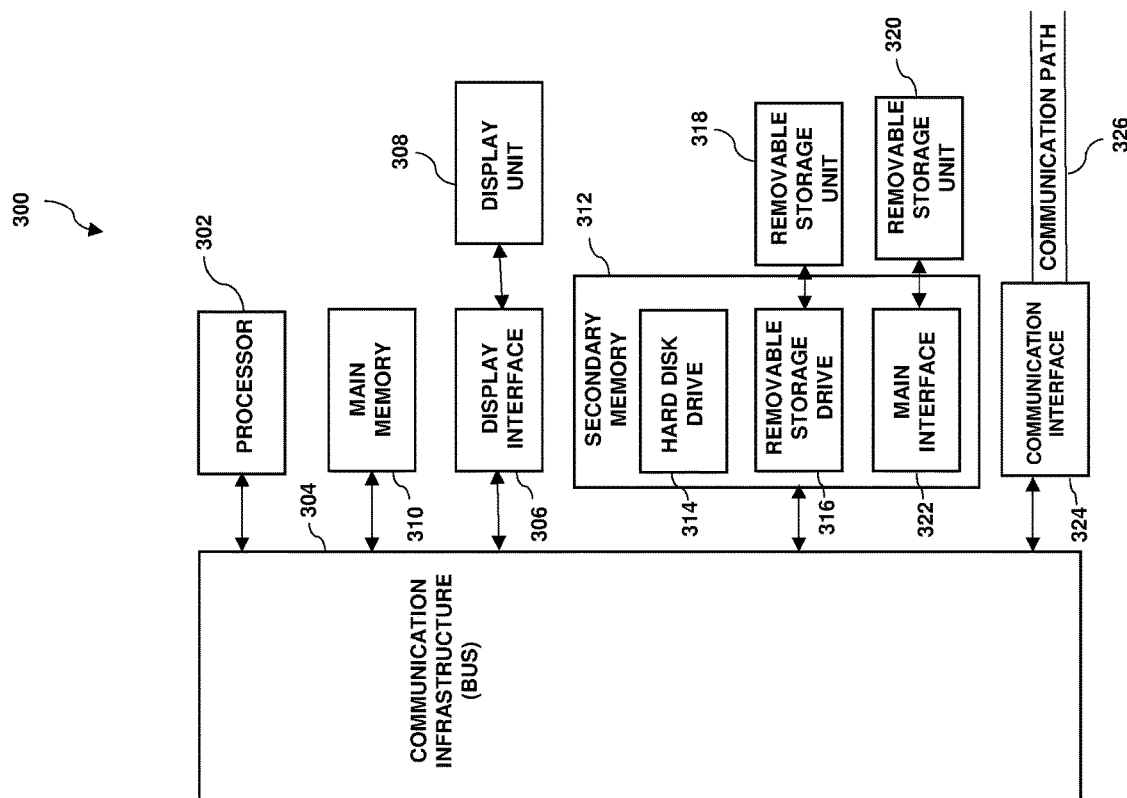
FIG. 3 depicts an exemplary computer system capable of implementing one or more embodiments of the present invention.

Turning now to a more detailed description of the present disclosure, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 that allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
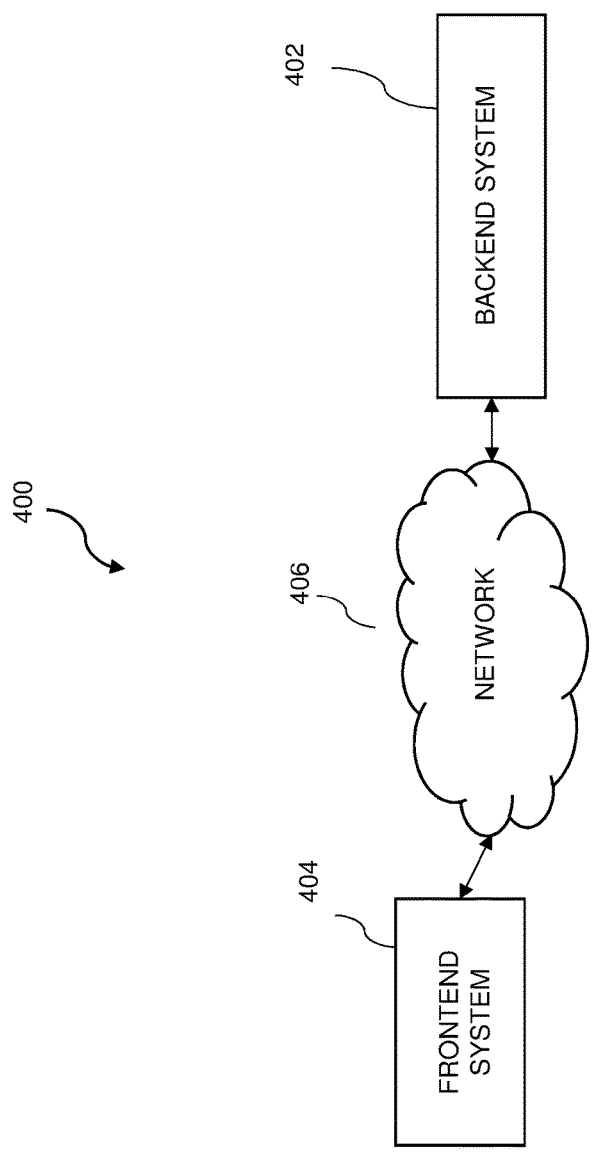
FIG. 4 depicts a block diagram of an example system for providing a cognitive collation configuration service to process multilingual data in accordance with one or more embodiments of the present invention.

FIG. 4 illustrates a block diagram of an example system 400 for providing a cognitive collation configuration (CCC) service to process multilingual data in accordance with one or more embodiments of the present invention. In the example shown in FIG. 4, system 400 includes a backend system 402 and a frontend system 404. Additional detail regarding the components of backend system 402 and frontend system 404 will be described below in relation to backend system 502 and frontend system 504 of system 500 shown in FIG. 5. In some embodiments of the present invention, backend system 402 and/or frontend system 404 form part of a multithreaded computer system operating in a concurrent programming environment. In general, in concurrent programming environments, a set of processes may be executed on one or more processors (e.g., processor 302). A process refers to a unit of concurrent programming (e.g., a program or section of a program). Multiple processes may execute the same section of the program simultaneously and each process may, in turn, include multiple threads. A process thread refers to a sub-element of a process or a stream of instructions simultaneously executed within the same program. In concurrent programming, a multithreading processing technique may be employed that enables two or more of the same type of transaction to be carried out simultaneously. Each stream processes a different transaction message.

In some embodiments of the present invention, backend system 402 is a standalone computing device, a management server, a web server, a mobile computing device, or other suitable electronic device and/or computing system capable of receiving, sending, and processing data. In some embodiments of the present invention, backend system 402 is software such as an application, module, or operating system that is executable on a standalone computing device, a management server, a web server, a mobile computing device, or other suitable electronic device and/or computing system capable of receiving, sending, and processing data. In some embodiments of the present invention, backend system 402 is a server computing system utilizing multiple computers, such as in cloud computing environment 50 (FIG. 1). In some embodiments of the present invention backend system 402 is a laptop computer, a tablet computer, a netbook computer, a personal computer (PC), a desktop computer, a personal digital assistant (PDA), a smartphone, or other suitable programmable electronic device capable of communicating with backend system 402, and other applications or computing devices (not shown) via network 406. In some embodiments of the present invention, backend system 402 is a computing system utilizing clustered computers and components (e.g., database server computers, application server computers, etc.) that act as a single pool of seamless resources that are accessible within a distributed environment. Backend system 402 may have internal and external hardware components, such as those depicted and described above with respect to FIG. 3.

Network 406 can be, for example, a telecommunications network, a local area network (LAN), a wide area network (WAN) such as the Internet, or a combination of the three and can include wired, wireless, or fiber optic connections. Network 406 can include one or more wired and/or wireless networks that are capable of receiving and transmitting data, voice, and/or video signals including multimedia signals that include voice, data, and video information. In general, network 406 can be any suitable combination of connections and protocols that can support communications backend system 402, frontend system 404, and/or other applications or computing devices (not shown) within a distributed environment. In some embodiments of the present invention, system 400 is implemented as part of a cloud computing environment such as cloud computing environment 50 (FIG. 1). In some embodiments of the present invention, network 406 interconnects backend system 402 and frontend system 404 via a communication infrastructure 304 and/or communication path 326 (FIG. 3).

In some embodiments of the present invention, frontend system 404 is a user device such as a laptop computer, a tablet computer, a netbook computer, a personal computer (PC), a desktop computer, a personal digital assistant (PDA), a smartphone, an Internet-of-things (IoT) enabled device, and/or other suitable programmable electronic devices capable of communicating with various components and devices within a distributed environment. In some embodiments of the present invention, frontend system 404 is a programmable electronic mobile device or a combination of programmable electronic mobile devices capable of executing machine-readable program instructions and communicating with other computing devices (not shown) within a distributed environment. In some embodiments of the present invention, frontend system 404 is software such an application, module, or operating system that is executable on a standalone computing device, a management server, a web server, a mobile computing device, or other suitable electronic device and/or computing system capable of receiving, sending, and processing data. In some embodiments of the present invention, frontend system 404 may include internal and external hardware components, such as those depicted and described above with respect to FIG. 3.

System 400 is a machine learning system that can be utilized to solve a variety of technical issues (e.g., learning previously unknown functional relationships) in connection with technologies such as, but not limited to, machine learning technologies, video processing technologies, language sorting technologies, data analytics technologies, data classification technologies, data clustering technologies, recommendation system technologies, signal processing technologies, and/or other digital technologies. System 400 employs hardware and/or software to solve problems that are highly technical in nature, that are not abstract and that cannot be performed as a set of mental acts by a human. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. For example, in some embodiments of the present invention, backend system 402 and frontend system 404 are embodied as a single server.

Figure 5:
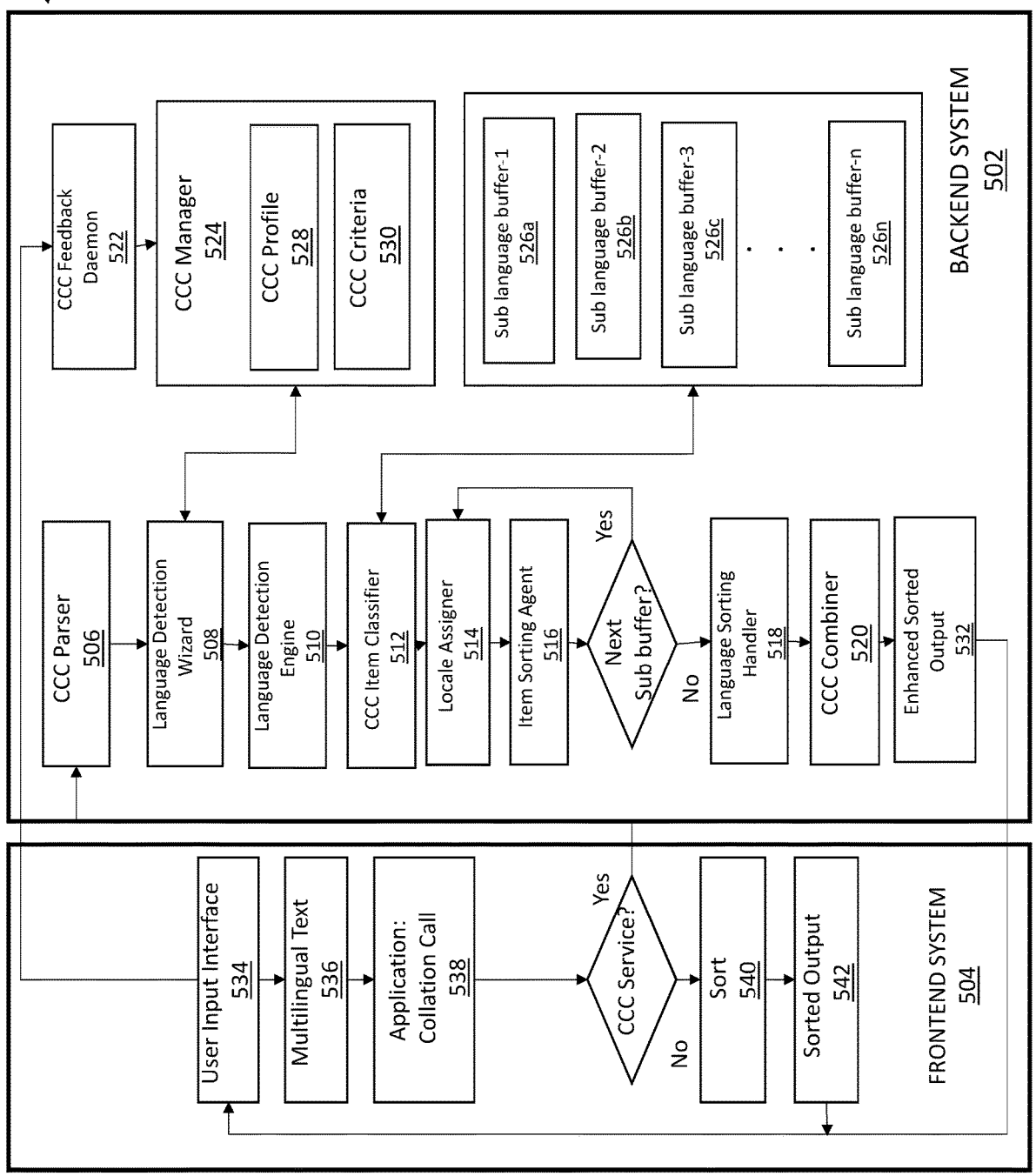
FIG. 5 depicts a block diagram of another example system and corresponding component flow for providing a cognitive collation configuration service to process multilingual data in accordance with one or more embodiments of the present invention.

FIG. 5 depicts a block diagram of an example system 500 and corresponding component flow for providing a CCC service that processes multilingual data in accordance with one or more embodiments of the present invention. System 500 includes a backend system 502 and a frontend system 504, in which backend system 502 includes a CCC parser 506, a language detection wizard 508, a language detection engine 510, a CCC item classifier 512, a locale assigner 514, an item sorting agent 516, a language sorting handler 518, a CCC combiner 520, a CCC feedback daemon 522, a CCC manager 524, and a plurality of sub language buffers 526$a$-526$n$. In some embodiments of the present invention, CCC manager 524 includes a CCC profile 528 and CCC criteria 530. In some embodiments of the present invention, CCC parser 506, language detection wizard 508, language detection engine 510, CCC item classifier 512, locale assigner 514, item sorting agent 516, language sorting handler 518, CCC combiner 520, CCC feedback daemon 522, CCC manager 524, and/or sub language buffers 526$a$-526$n$ are interconnected via a communication infrastructure 304 and/or communication path 326.

CCC parser 506 includes an application, module, or system that is configured to receive a multilingual input text from frontend system 504 and to parse the multilingual input text into a plurality of collation items (e.g., item$_i$(item$_1$, item$_2$, item$_3$, . . . , item$_m$)). The multilingual input text includes text that is in more than one language, in which each language may be associated with one or more locales. In some embodiments of the present invention, each collation item represents a line, paragraph, row, or other segment of text of the multilingual input text. Accordingly, in some embodiments of the present invention in which the multilingual input text includes a plurality of lines of text, CCC parser 506 segments the multilingual input text into a plurality of lines in which each line is a collation item. Each collation item includes one or more collation elements (e.g., characters, sequence of characters, etc.). In some embodiments of the present invention, backend system 502 is configured to pass the multilingual input text to CCC parser 506 in response to backend system 502 receiving a sorting request from frontend system 504. In some embodiments of the present invention, the sorting request is received from frontend system 504 via a function call of a service API, in which the sorting request includes the multilingual input text. CCC parser 506 is configured to transmit the parsed multilingual input text to language detection wizard 508 and/or language detection engine 510.

Language detection wizard 508 includes an application, module, or system that acts as client to call language detecting engine 510 according to predefined CCC criteria for detecting a language (item$_i$, L$_k$) for each given parsed item (item$_i$), where language L$_k$(L$_1$, L$_2$, L$_3$, L$_4$, . . . , L$_n$). Language detection engine 510 includes an application, module, or system that provides a service API (e.g., standalone or SaaS) for determining a language name of a given string and returning a determined language back to the caller (e.g., language detection wizard 508). Various suitable language detection engines may be utilized as known to those having ordinary skill in the art. In some embodiments of the present invention, functions performed by language detection wizard 508 and language detection engine 510 are provided by a single application, module, or system of backend system 502. In some embodiments of the present invention, language detection engine 510 can be external and/or separated from backend system 502.

CCC item classifier 512 includes an application, module, or system that is configured to store each detected item into a corresponding sub language buffer of the plurality of sub language buffers 526a-526n according to the returned language name, in which the plurality of sub language buffers 526a-526n are a set of sub buffers that temporarily store the detected items (b[L$_1$], b[L$_2$], b[L$_3$], b[L$_4$], . . . , b[L$_n$]). For example, consider a scenario where an input text includes lines of text in English, French, and Japanese, CCC item classifier 512 would store English text in an English associated sub language buffer 526a, store French text in a French associated sub language buffer 526b, and store Japanese text in a Japanese associated sub language buffer 526c.

Figure 6:
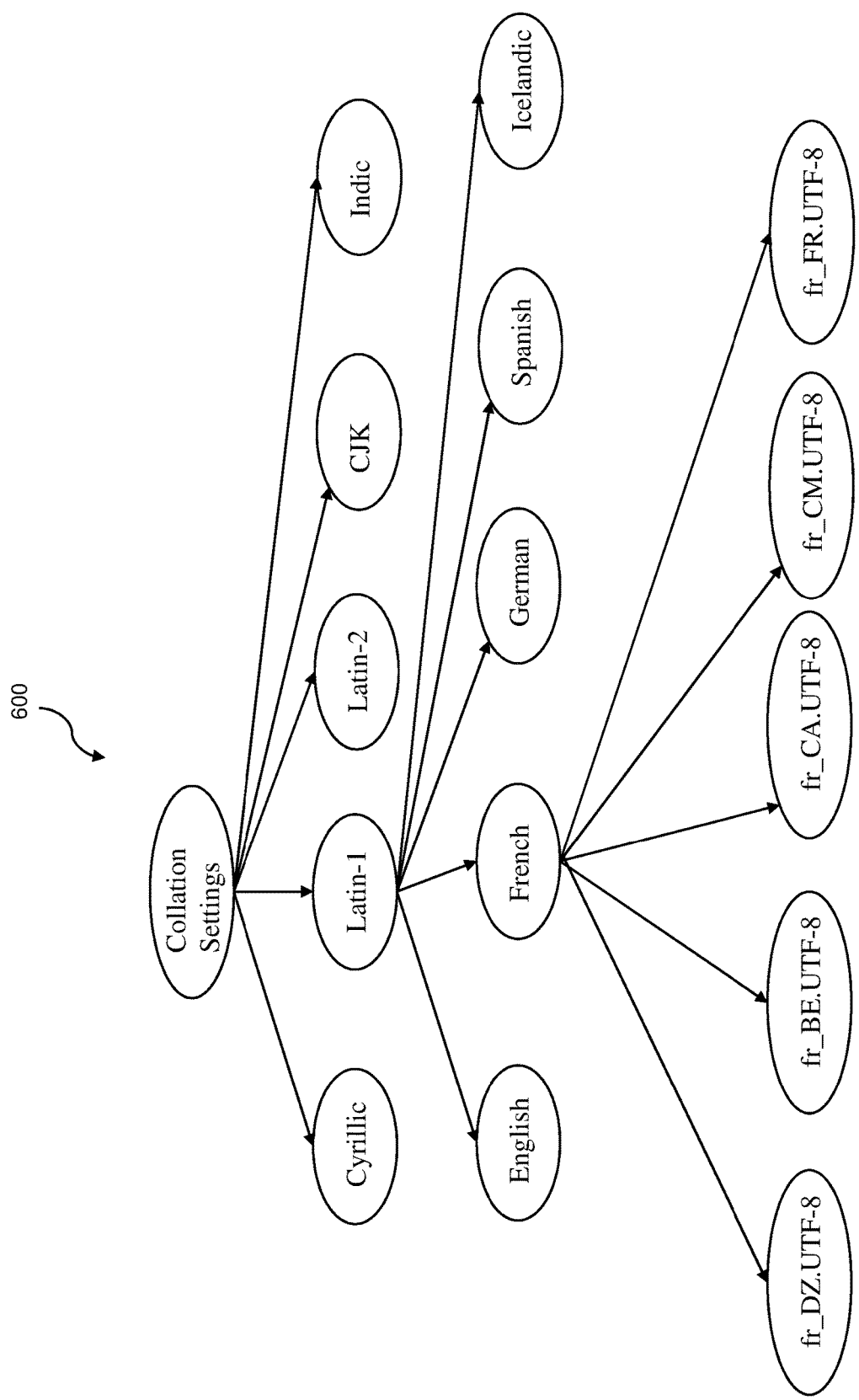
FIG. 6 depicts a hierarchical diagram of example cognitive collation configuration settings in accordance with one or more embodiments of the present invention.

Locale assigner 514 includes an application, module, or system that is configured to assign a collation locale name to each detected language L$_k$(L$_1$, L$_2$, L$_3$, . . . , L$_4$, . . . , L$_n$) based on a set of locale collation rules (e.g., locale settings of CCC settings). Item sorting agent 516 includes an application, module, or system that is configured to sort each sub language buffer b[L$_k$] according to locale collation rules that are associated with the assigned collation locale name (e.g., perform a sort for each of (b[L$_1$], b[L$_2$], b[L$_3$], b[L$_4$], . . . , b[L$_n$])). For example, in some embodiments of the present invention, item sorting agent 516 is configured to perform a sorting operation within each given sub language buffer, of the plurality of sub language buffers 526a-526n, in which the sorting operation sorts a plurality of collation elements of the given sub language buffer. In some embodiments of the present invention, the sorting of the plurality of collation elements is performed based on a predetermined locale selection list (e.g., locale selection policy) associated with the set of CCC settings. The sorting operation that is performed by item sorting agent 516 is referenced herein as "the second sort operation." FIG. 6 depicts a hierarchical diagram of example CCC settings 600 in accordance with one or more embodiments of the present invention, in which CCC settings 600 include a plurality of different groups and levels.

Figure 7:
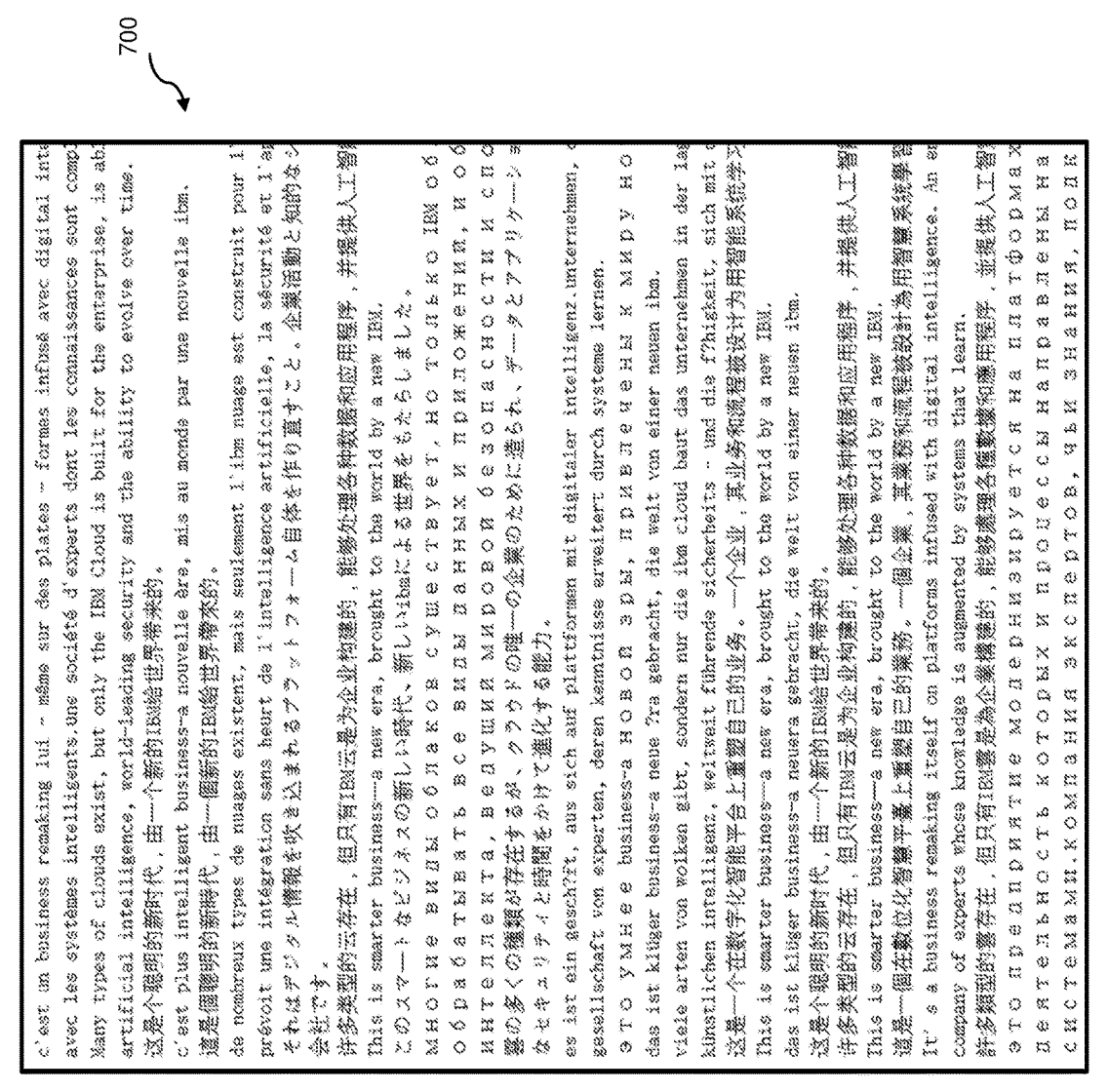

Referring back to FIG. 5, language sorting handler 518 includes an application, module, or system that is configured to perform a top layer sort of all sub language buffers (b[L$_1$], b[L$_2$], b[L$_3$], b[L$_4$], . . . , b[L$_n$]) based on current language/locale settings. The sorting operation that is performed by language sorting handler 518 is referenced herein as the "first sort operation." CCC combiner 520 includes an application, module, or system that is configured to merge the content of all the sub language buffers 526a-526n to generate an enhanced sorted output 532. FIG. 7 depicts an example multilingual data input 700 that may be received by backend system 502 from frontend system 504 in accordance with one or more embodiments of the present invention, in which the multilingual data includes unsorted Unicode text of mixed languages and locales. FIG. 8 illustrates an example enhanced sorted output 800 that may be generated in response to sorting the unsorted text input of FIG. 7 in accordance with one or more embodiments of the present invention, in which enhanced sorted output comprises Unicode text that is generated by CCC combiner 520. In this example, enhanced sorted output 800 includes a sorted German (de_DE) portion 802, a sorted English (en_US) portion 804, a sorted French (fr_FR) portion 806, a sorted Japanese (ja_JP) portion 808, a sorted Russian (ru_RU) portion 810, a sorted Simplified Chinese (zh_Hans_CN) portion 812, and a sorted Traditional Chinese (zh_Hant_HK) portion 814. As can be seen in FIG. 8, text of Simplified Chinese and Traditional Chinese are segmented into different portions 812 and 814, in which each portion is sorted based on the particular locale that is assigned to the language of the portion based on locale.

In some embodiments of the present invention, backend system 502 is configured to transmit the enhanced sorted output 532 to frontend system 504 in response to receiving a sorting request from frontend system 504. In some embodiments of the present invention, the request is made via function call of a service API.

CCC feedback daemon 522 includes an application, module, or system that is configured to monitor and/or learn sorting preferences (e.g., customized settings) of one or more users and then to adjust CCC criteria 530 in real-time. In some embodiments of the present invention, CCC feedback daemon 522 is configured to execute one or more machine learning models to adjust CCC criteria 530 in view of the learned sorting preferences of the one or more users.

CCC manager 524 includes an application, module, or system that manages and stores CCC profiles(s) 528 and CCC criteria 530 for one or more users. In some embodiments of the present invention, CCC manager 524 is configured to present a user interface to an administrator or to a user. CCC manager 524 is configured to learn the user's collation preferences via input from the user via the user interface, and to generate and store a CCC profile 528 for the user. In some embodiments of the present invention, the learned user collation preferences comprise user defined customized CCC settings. In some embodiments of the present invention, the customized CCC settings of a user includes a minimum language section, a language determination threshold, and/or locale selection policy for the user. For example, in some embodiments of the present invention, the CCC data structure of a user's customized CCC settings is in the form of [UserID, DeviceID, LanguagePreferenceList, Minimum LanguageSection, LanguageDeterminationThreshold, LocaleSelectionList, . . . ], which in some embodiments is stored in a database. In some embodiments of the present invention, the customized CCC settings for a User-A are set to be the same as a User-B's default CCC settings if CCC manager 524 learns that User-A and User-B share one or more certain commonalities (e.g., same or similar geo-location, language skills, sorting preferences, source of data, etc.) In some embodiments of the present invention, CCC profile 528 is a hierarchical structure that is configured to store CCC criteria data and related configuration data. In some embodiments of the present invention, CCC profile 528 includes both service settings and users' personalized customized settings for use with different CCC criteria 530. In some embodiments of the present invention, the user interface is configured to define and adjust the CCC criteria 530. In some embodiments of the present invention, the backend system 502 causes frontend system 504 to display the user interface to obtain a user's customized CCC settings.

Frontend system 504 is configured to receive an input from a user via a user input interface 534, in which the input includes multilingual input data (e.g., multilingual text 536). In some embodiments of the present invention, an application 538 of frontend system 504 is configured to transmit a sort request to backend system 502, in which the sort request includes the multilingual input data. In some embodiments of the present invention, the sort request is transmitted by the execution of a function call of a CCC service API to backend system 502 to cause backend system 502 to provide frontend system 504 with an enhanced sorted output 532 of the multilingual input. In some embodiments of the present invention, frontend system 504 is configured to determine whether to make a function call to backend system 502 based on whether CCC service functionality is enabled and/or available. In some embodiments of the present invention, if application 538 does not call backend system 502, then frontend system 504 itself performs sort operation 540 on the multilingual input text 536 and then outputs an unenhanced sorted output 542 back to the user.

Figure 9:
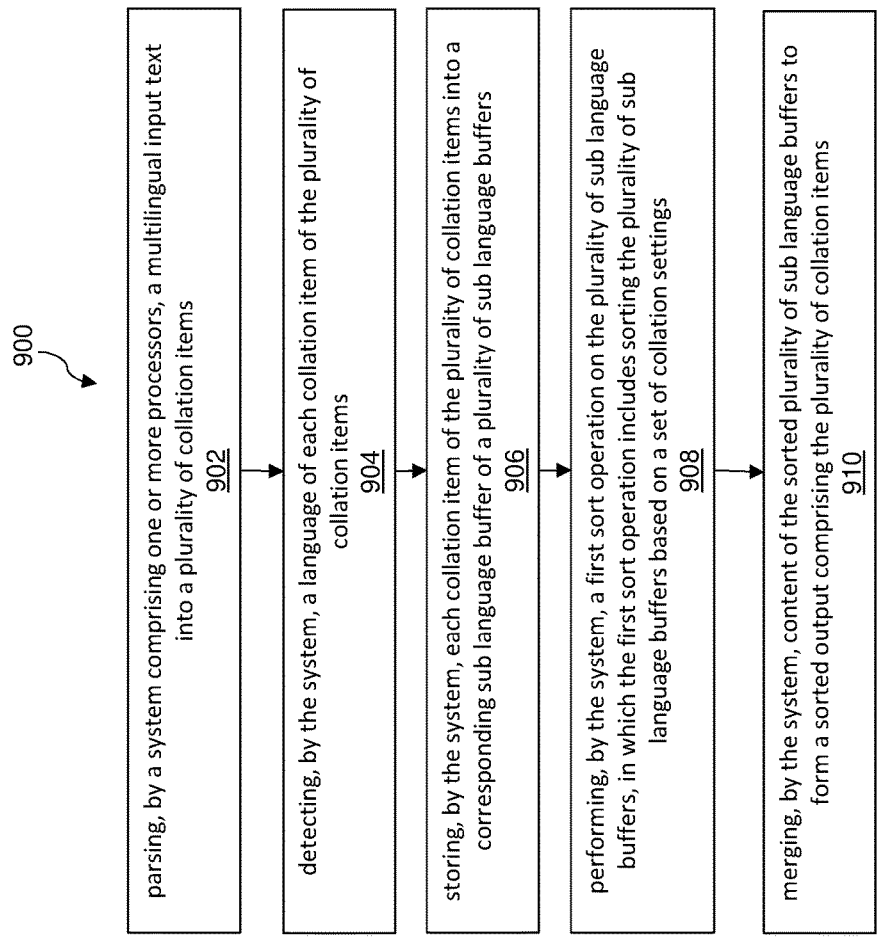
FIG. 9 depicts a flow diagram illustrating a methodology in accordance with one or more embodiments of the present invention.

Additional details of the operation of systems 400 and systems 500 will now be described with reference to FIG. 9, wherein FIG. 9 depicts a flow diagram illustrating a methodology 900 according to one or more embodiments of the present invention. At 902, a multilingual input text is parsed into a plurality of collation items. In some embodiments of the present invention, each collation item of the plurality of collation items includes a plurality of collation elements. In some embodiments of the present invention, the plurality of collation items comprises a plurality of lines of text of the multilingual input text. In some embodiments of the present invention, the plurality of collation elements of each collation item, of the plurality of collation items, comprises a plurality of characters of each line of text of the plurality of lines of text. At 904, a language of each collation item, of the plurality of collation items, is detected. At 906, each collation item, of the plurality of collation items, is stored into a corresponding sub language buffer of a plurality of sub language buffers, in which each sub language buffer of the plurality of sub language buffers is associated with a different language of a plurality languages. At 908, a first sort operation on the plurality of sub language buffers, in which the first sort operation includes sorting the plurality of sub language buffers based on a set of collation settings. In some embodiments of the present invention in the set of collation settings includes a language selection list and/or a locale selection list. At 910, content of the sorted plurality of sub language buffers are merged to form a sorted output comprising the plurality of collation items.

In some embodiments of the present invention, methodology 900 further includes performing a second sort operation within each sub language buffer, of the plurality of sub language buffers, in which the second sort operation of a sub language buffer includes sorting the plurality of collation elements of the sub language buffer based on the locale selection list. In some embodiments of the present invention, the merging of the content of the sub language buffers is performed subsequent to the second sort operation and the first sort operation.

In some embodiments of the present invention, methodology 900 further includes prior to parsing the multilingual input text, receiving a sorting request from a frontend system via a function call of a service API, in which the sorting request includes the multilingual input text. In some embodiments of the present invention, methodology 900 further includes transmitting the sorted output to the frontend system in response to the received sorting request.

In some embodiments of the present invention, methodology 900 further includes executing a feedback daemon that is configured to monitor and learn sorting preferences of one or more users, wherein the feedback daemon is further configured to adjust the set of collation settings, in real-time, based on the learned sorting preferences.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of cognitive collation configuration processing of multilingual data comprising:
   parsing, by a system comprising one or more processors, a multilingual input text into a plurality of collation items;
   detecting, by the system, a language of each collation item of the plurality of collation items, wherein the language is one of a plurality of different languages and the detecting is based at least in part on content of the collation item meeting a language determination threshold that includes words to be excluded from being used in the detecting, wherein the words to be excluded are predetermined and comprise one or both of an entity name and an acronym;
   storing, by the system, each collation item, of the plurality of collation items, into a corresponding sub language buffer of a plurality of sub language buffers;
   performing, by the system, a first sort operation on the plurality of sub language buffers, wherein the first sort operation includes sorting the plurality of sub language buffers based on a set of collation settings, wherein the set of collation settings includes a language selection list;
   performing a second sort operation on contents of a sub language buffer of the plurality of sub language buffers using a first locale collation rule selected from a plurality of locale collation rules based on a user preference, wherein at least two of the plurality of locale collation rules produce different results when used in the second sort operation; and merging, by the system, content of the sorted plurality of sub language buffers to form a sorted output comprising the plurality of collation items.

2. The computer-implemented method of claim 1, wherein the user preference of a first user is set by the system to be the same as the user preference of a second user based at least in part on the system detecting commonalities between the first user and the second user.

3. The computer-implemented method of claim 1, wherein the plurality of collation items comprises a plurality of lines of text of the multilingual input text, wherein the plurality of collation elements of each collation item, of the plurality of collation items, comprises a plurality of characters of each line of text of the plurality of lines of text.

4. The computer-implemented method of claim 1 further comprising:

prior to parsing the multilingual input text, receiving, by the system, a sorting request from a frontend system via a function call of a service API, wherein the sorting request includes the multilingual input text; and transmitting, by the system, the sorted output to the frontend system in response to the received sorting request.

5. The computer-implemented method of claim 1 further comprising:

executing, by the system, a feedback daemon that is configured to monitor and learn sorting preferences of one or more users, wherein the feedback daemon is further configured to adjust the set of collation settings, in real-time, based on the learned sorting preferences.

6. A computer-implemented method of cognitive collation configuration processing of multilingual data comprising:

transmitting, by a system comprising one or more processors, a sorting request to a backend system, wherein the sorting request includes a multilingual input text;

wherein the backend system is configured to:

parse the multilingual input text into a plurality of collation items;

detect a language of each collation item of the plurality of collation items, wherein the language is one of a plurality of different languages and the detecting is based at least in part on content of the collation item meeting a language determination threshold that includes words to be excluded from being used in the detecting, wherein the words to be excluded are predetermined and comprise one or both of an entity name and an acronym;

store each collation item, of the plurality of collation items, into a corresponding sub language buffer of a plurality of sub language buffers;

perform a first sort operation on the plurality of sub language buffers, wherein the first sort operation includes sorting the plurality of sub language buffers based on a set of collation settings, wherein the set of collation settings includes a language selection list;

perform a second sort operation on contents of a sub language buffer of the plurality of sub language buffers using a first locale collation rule selected from a plurality of locale collation rules based on a user preference, wherein at least two of the plurality of locale collation rules produce different results when used in the second sort operation; and merge content of the sorted plurality of sub language buffers to form a sorted output comprising the plurality of collation items.

7. The computer-implemented method of claim 6, wherein wherein the merging is performed subsequent to the second sort operation and the first sort operation.

8. The computer-implemented method of claim 6, wherein the plurality of collation items comprises a plurality of lines of text of the multilingual input text, wherein the plurality of collation elements of each collation item, of the plurality of collation items, comprises a plurality of characters of each line of text of the plurality of lines of text.

9. The computer-implemented method of claim 6, wherein the sorting request is sent from the system to the backend system via a function call of a service API, wherein the backend system is further configured to transmit the sorted output to the system in response to the received sorting request.

10. The computer-implemented method of claim 6, wherein the backend system is further configured to execute a feedback daemon, wherein the feedback daemon is configured to monitor and learn sorting preferences of one or more users, wherein the feedback daemon is further configured to adjust the set of collation settings, in real-time, based on the learned sorting preferences.

11. A system for cognitive collation configuration processing of multilingual data, the system comprising one or more processors configured to perform a method comprising:

parsing, by the system, a multilingual input text into a plurality of collation items;

detecting, by the system, a language of each collation item of the plurality of collation items, wherein the language is one of a plurality of different languages and the detecting is based at least in part on content of the collation item meeting a language determination threshold that includes words to be excluded from being used in the detecting, wherein the words to be excluded are predetermined and comprise one or both of an entity name and an acronym;

storing, by the system, each collation item, of the plurality of collation items, into a corresponding sub language buffer of a plurality of sub language buffers;

performing, by the system, a first sort operation on the plurality of sub language buffers, wherein the first sort operation includes sorting the plurality of sub language buffers based on a set of collation settings, wherein the set of collation settings includes a language selection list;

performing a second sort operation on contents of a sub language buffer of the plurality of sub language buffers using a first locale collation rule selected from a plurality of locale collation rules based on a user preference, wherein at least two of the plurality of locale collation rules produce different results when used in the second sort operation; and merging, by the system, content of the sorted plurality of sub language buffers to form a sorted output comprising the plurality of collation items.

12. The system of claim 11, wherein the merging is performed subsequent to the second sort operation and the first sort operation.

13. The system of claim 11, wherein the plurality of collation items comprises a plurality of lines of text of the multilingual input text, wherein the plurality of collation elements of each collation item, of the plurality of collation items, comprises a plurality of characters of each line of text of the plurality of lines of text.

14. The system of claim 11 further comprising:
prior to parsing the multilingual input text, receiving, by the system, a sorting request from a frontend system via a function call of a service API, wherein the sorting request includes the multilingual input text; and
transmitting, by the system, the sorted output to the frontend system in response to the received sorting request.

15. The system of claim 11 further comprising:
executing, by the system, a feedback daemon that is configured to monitor and learn sorting preferences of one or more users, wherein the feedback daemon is further configured to adjust the set of collation settings, in real-time, based on the learned sorting preferences.

16. A computer program product for cognitive collation configuration processing of multilingual data, the computer program product comprising a computer readable storage medium having program instructions embodied therewith, the program instructions executable by a backend system comprising one or more processors to cause the backend system to perform a method comprising:
parsing, by the backend system, a multilingual input text into a plurality of collation items;
detecting, by the backend system, a language of each collation item of the plurality of collation items, wherein the language is one of a plurality of different languages and the detecting is based at least in part on content of the collation item meeting a language determination threshold that includes words to be excluded from being used in the detecting, wherein the words to be excluded are predetermined and comprise one or both of an entity name and an acronym;
storing, by the backend system, each collation item, of the plurality of collation items, into a corresponding sub language buffer of a plurality of sub language buffers;
performing, by the backend system, a first sort operation on the plurality of sub language buffers, wherein the first sort operation includes sorting the plurality of sub language buffers based on a set of collation settings, wherein the set of collation settings includes a language selection list;
performing a second sort operation on contents of a sub language buffer of the plurality of sub language buffers using a first locale collation rule selected from a plurality of locale collation rules based on a user preference, wherein at least two of the plurality of locale collation rules produce different results when used in the second sort operation; and
merging, by the backend system, content of the sorted plurality of sub language buffers to form a sorted output comprising the plurality of collation items.

17. The computer program product of claim 16, wherein the merging is performed subsequent to the second sort operation and the first sort operation.

18. The computer program product of claim 16, wherein the plurality of collation items comprises a plurality of lines of text of the multilingual input text, wherein the plurality of collation elements of each collation item, of the plurality of collation items, comprises a plurality of characters of each line of text of the plurality of lines of text.

19. The computer program product of claim 16 further comprising:
prior to parsing the multilingual input text, receiving, by the backend system, a sorting request from a frontend system via a function call of a service API, wherein the sorting request includes the multilingual input text; and
transmitting, by the backend system, the sorted output to the frontend system in response to the received sorting request.

20. The computer program product of claim 16 further comprising:
executing, by the backend system, a feedback daemon that is configured to monitor and learn sorting preferences of one or more users, wherein the feedback daemon is further configured to adjust the set of collation settings, in real-time, based on the learned sorting preferences.

21. A system for cognitive collation configuration processing of multilingual data, the system comprising:
one or more processors;
a memory operatively coupled to the one or more processors;
a frontend component; and
a backend component;
wherein the frontend component is configured to transmit a sorting request to the backend component, wherein the sorting request includes a multilingual input text;
wherein the backend component is configured to:
parse the multilingual input text into a plurality of collation items;
detect a language of each collation item of the plurality of collation items, wherein the language is one of a plurality of different languages and the detecting is based at least in part on content of the collation item meeting a language determination threshold that includes words to be excluded from being used in the detecting, wherein the words to be excluded are predetermined and comprise one or both of an entity name and an acronym;
store each collation item, of the plurality of collation items, into a corresponding sub language buffer of a plurality of sub language buffers;
perform a first sort operation on the plurality of sub language buffers, wherein the first sort operation includes sorting the plurality of sub language buffers based on a set of collation settings, wherein the set of collation settings includes a language selection list;
perform a second sort operation on contents of a sub language buffer of the plurality of sub language buffers using a first locale collation rule selected from a plurality of locale collation rules based on a user preference, wherein at least two of the plurality of locale collation rules produce different results when used in the second sort operation; and
merge content of the sorted plurality of sub language buffers to form a sorted output comprising the plurality of collation items.

22. The system of claim 21, wherein the merging is performed subsequent to the second sort operation and the first sort operation.

23. The system of claim 21, wherein the plurality of collation items comprises a plurality of lines of text of the multilingual input text, wherein the plurality of collation elements of each collation item, of the plurality of collation items, comprises a plurality of characters of each line of text of the plurality of lines of text.

24. The system of claim 21, wherein the sorting request is sent from the frontend component to the backend component via a function call of a service API, wherein the backend component is further configured to transmit the sorted output to the frontend component in response to the received sorting request.

25. The system of claim 21, wherein the backend component is further configured to execute a feedback daemon, wherein the feedback daemon is configured to monitor and learn sorting preferences of one or more users, wherein the feedback daemon is further configured to adjust the set of collation settings, in real-time, based on the learned sorting preferences.

* * * * *